US011940118B2

(12) United States Patent
Michaelis et al.

(10) Patent No.: US 11,940,118 B2
(45) Date of Patent: Mar. 26, 2024

(54) LIGHTING DEVICE FOR A VEHICLE

(71) Applicant: HELLA GmbH & Co. KGaA, Lippstadt (DE)

(72) Inventors: Alfons Michaelis, Borchen (DE); Martin Muegge, Geseke (DE); Diana Mundt, Lippstadt (DE)

(73) Assignee: Hella GmbH & CO. KGAA, Lippstadt (DE)

( * ) Notice: Subject to any disclaimer, the term of this patent is extended or adjusted under 35 U.S.C. 154(b) by 0 days.

(21) Appl. No.: 17/948,853

(22) Filed: Sep. 20, 2022

(65) Prior Publication Data

US 2023/0016329 A1 Jan. 19, 2023

Related U.S. Application Data

(63) Continuation of application No. PCT/EP2021/055702, filed on Mar. 8, 2021.

(30) Foreign Application Priority Data

Mar. 20, 2020 (DE) ..................... 10 2020 107 728.9

(51) Int. Cl.
*F21S 43/31* (2018.01)
*F21S 41/125* (2018.01)
(Continued)

(52) U.S. Cl.
CPC ............. *F21S 43/31* (2018.01); *F21S 41/125* (2018.01); *F21S 41/40* (2018.01); *F21S 43/14* (2018.01); *F21V 7/06* (2013.01); *F21Y 2115/10* (2016.08)

(58) Field of Classification Search
CPC .............. F21S 43/31; F21S 43/40; F21V 7/06
See application file for complete search history.

(56) References Cited

U.S. PATENT DOCUMENTS 4,868,719 A 9/1989 Kouchi et al.
5,490,049 A * 2/1996 Montalan ............... H05B 45/40 362/240

(Continued)

FOREIGN PATENT DOCUMENTS

DE 3874722 T2 4/1993
DE 20008291 U1 9/2001

(Continued)

OTHER PUBLICATIONS

International Search Report dated Jun. 9, 2021 in corresponding application PCT/EP2021/055702.

*Primary Examiner* — Eric T Eide
(74) *Attorney, Agent, or Firm* — Muncy, Geissler, Olds & Lowe, P.C.

(57) ABSTRACT

A lighting device for a vehicle, having a plurality of light sources, which are arranged in an array, in particular in line-by-line and column-by-column fashion, and can be operated independently of each other at least in part, wherein the light sources emit light during operation; an exit face through which the light emanating from the light sources passes; and a plurality of extensive boundary elements, which extend at least partly in a region between the light sources and the exit face and serve to separate the light emanating from different light sources, wherein at least some, preferably all, of the extensive boundary elements have a reflector which at least partly reflects the light emanating from one of the light sources in the direction of the exit face.

17 Claims, 6 Drawing Sheets

(51) Int. Cl.

| | |
|---|---|
| ***F21S 41/40*** | (2018.01) |
| ***F21S 43/14*** | (2018.01) |
| ***F21V 7/06*** | (2006.01) |
| ***F21Y 115/10*** | (2016.01) |

(56) References Cited

U.S. PATENT DOCUMENTS

| | | | | |
|---|---|---|---|---|
| 5,819,454 | A * | 10/1998 | Rosenitsch | G09F 9/33 362/240 |
| 8,807,809 | B2 | 8/2014 | Kloos | |
| 9,656,598 | B1 | 5/2017 | Salter et al. | |
| 9,896,023 | B1 * | 2/2018 | Salter | F21S 43/255 |
| 10,112,528 | B1 * | 10/2018 | Mazuir | B60Q 1/44 |
| 2010/0066249 | A1 * | 3/2010 | Nagafuchi | F21S 43/30 362/516 |
| 2015/0377453 | A1 | 12/2015 | Ji et al. | |
| 2016/0040840 | A1 * | 2/2016 | Gattari | F21V 5/002 362/328 |
| 2020/0355340 | A1 | 11/2020 | Wu et al. | |
| 2022/0268418 | A1 * | 8/2022 | Park | F21S 43/16 |

FOREIGN PATENT DOCUMENTS

| | | | |
|---|---|---|---|
| DE | 102011054234 | A1 | 4/2013 |
| DE | 102016119326 | A1 | 4/2018 |
| DE | 202019105375 | U1 | 1/2020 |
| DE | 102018213563 | A1 | 2/2020 |

* cited by examiner

LIGHTING DEVICE FOR A VEHICLE

This nonprovisional application is a continuation of International Application No. PCT/EP2021/055702, which was filed on Mar. 8, 2021, and which claims priority to German Patent Application No. 10 2020 107 728.9, which was filed in Germany on Mar. 20, 2020, and which are both herein incorporated by reference.

BACKGROUND OF THE INVENTION

Field of the Invention

The present invention relates to a lighting device for a vehicle.

Description of the Background Art

A lighting device of the aforementioned type is known from DE 10 2016 119 326 A1. The lighting device described therein comprises a plurality of light-emitting diodes serving as light sources, which are arranged in line by line and column by column fashion in an array and can be operated at least partly independently of each other, as well as an exit face through which the light emanating from the light sources passes. Due to the independent control of the light-emitting diodes, different segments of the exit face can be illuminated differently, so that, for example, signatures can be generated on the exit face. The lighting device also comprises a plurality of extensive boundary elements which extend in a region between the light sources and the exit face and serve to separate the light emanating from different light sources. For large and curved lighting devices such as rear lights integrated into the contour of the vehicle, several printed circuit boards are provided, offset to each other and inclined to each other, on each of which a group of light-emitting diodes is arranged.

The structure known from DE 10 2016 119 326 A1 can be used well with lighting devices having a slightly swept horizontal contour, i.e., for rather extensive light contours. However, many lighting devices on vehicles tend to have greater sweep angles and more curved contour outlines, for example with a horizontal angle of 30° or more. Here, the structure described above reaches its limits, because in structures with a printed circuit board, the orientation of the planar circuit board and thus the light-emitting diodes behind the curved and swept optical disc is increasingly oriented outwards with increasing horizontal angles. As a result, the light is not emitted in the opposite direction of travel, which is where the legislature prescribes that the highest light intensities must go for the luminaire to be approved. In the case of a segmented luminaire, with an increasing horizontal angle for the printed circuit boards, there is a stronger gradation from column to column and, taking into account draft angles of the components, an unfavorable separation as well as unfavorable, different gradations in the rear view.

SUMMARY OF THE INVENTION

It is therefore an object of the present invention to provide a lighting device, which is suitable for distinctly swept vehicle lights and in particular is simply constructed and inexpensive or resource-saving to produce.

According to an exemplary embodiment, it is provided that at least some, preferably all, of the extensive boundary elements have a reflector that reflects the light emanating from one of the light sources at least partly in the direction of the exit face. Due to the reflectors, the light can be redirected in the desired main direction, for example, even with distinctly swept vehicle lights. In particular, a deflection of light can take place both in the horizontal direction and in the vertical direction. The arrangement of the boundary elements can form an extensive pixel matrix for the variable representation of signal light functions and information.

It may be provided that the reflectors are arranged in such a way that the light emanating from the light sources is reflected in a direction which, with the normal on the exit face, forms an angle greater than 0°, in particular wherein the angle is greater than 25°, preferably greater than 30°. As a result, even with greater sweep angles and more curved contour outlines, the light of the individual light sources can be deflected appropriately. In particular, it may be provided that the direction in which the light emanating from the light sources is reflected, is aligned substantially parallel to the direction of travel or the longitudinal direction of the vehicle when the lighting device is installed in the vehicle.

It is possible that each of the light sources is assigned to one of the reflectors. At least some, preferably all, of the reflectors may be designed as parabolic reflectors or free-form reflectors. In particular, the light of at least some, preferably all light sources can be appropriately deflected and concentrated by the reflectors designed in this way to ensure a high efficiency of the lighting device. This results in a desired light concentration in the axial, central region of the legal light distribution and a high performance of the overall system, whereby cost-effective and less powerful light sources can be used.

It may be provided that at least some, preferably all, of the light sources comprise at least one light-emitting diode, in particular an RGB light-emitting diode or a two-tone light-emitting diode or two light-emitting diodes of different colors. Each of the light sources can be controlled individually, wherein in particular each of the light-emitting diodes of a single light source is individually controllable. In this way, different colors can be selected as desired for each segment or pixel of the exit face, wherein in particular an adapted, individual design and positioning of a light function within the matrix formed by the segments is made possible. A two-tone variant, for example with the signal colors red and yellow, offers the possibility of realizing all three main signal functions taillight, brake light and direction indicator of a rear light with different light signatures and animations in the entire pixel functional region.

It is possible that the lighting device comprises at least one printed circuit board on which the light-emitting diodes are arranged, in particular wherein all light-emitting diodes are arranged on a maximum of three, in particular two, preferably on only one circuit board. Particularly when using only one printed circuit board, the structure of the lighting device is significantly simplified and cost-effective. Furthermore, by the corresponding alignment of a single circuit board, a common alignment or inclination of the reflectors can be made possible without the formation of horizontal and/or vertical stripe-shaped regions.

It may be provided that the at least one printed circuit board is substantially parallel to the exit face, in particular such that the printed circuit board has a rotation and tilt angle. As a result, a very compact design of the lighting device can be realized, because ultimately an extensive elongated housing can be used to accommodate the individual components.

It is possible that the extensive boundary elements are arranged in a grid-like manner, wherein in particular at least one boundary element is arranged between two neighboring light sources in the array and/or between the light emanating from neighboring light sources. The extensive boundary elements thus form segment diaphragms by means of which a clear demarcation of the light of individual neighboring light sources can be realized with simple means. In this case, the grid-like arrangement of the boundary elements may be differently designed and, for example, each have the shape of a rectangle, a rhombus, a trapezoid, a hexagon, an octagon or another shape.

It may be provided that a plurality of the boundary elements form a single-piece component or that all of the boundary elements form a single-piece component. In this way, components can be saved because the component formed by the boundary elements also includes the reflectors.

It is possible that the lighting device comprises an optical disc arranged between the light sources and the exit face, in particular between the reflectors and the exit face, wherein the light emanating from the light sources passes through the optical disc. In this case, the optical disc may be structured, in particular where the optical disc is provided with a scattering optics, preferably with a pillow optics or a diffractive optics. As a result, a homogeneous illumination of the exit face can be achieved, so that it can also be used, for example, as a display and indicator device.

It may be provided that the optical disc is formed and/or arranged in such a way that the light sources and/or the reflectors are not or not directly visible when looking through the exit face into the lighting device. In particular, the optical disc prevents the viewer from seeing the optical system located behind the optical disc. Furthermore, the respective segment surfaces or pixel surfaces on the exit face appear homogeneously and evenly illuminated.

It is possible that the illumination device comprises a grid which is arranged in the region of the optical disc, in particular on the side of the optical disc facing away from the light sources, wherein the grid preferably extends the grid-like arrangement of the reflectors. The grid, which is designed, for example, as an aperture grid or design grid, can more clearly emphasize the separation of the optical disc into segments. In this way, a design element can also be provided, which can serve, for example, with different coloring for design variants of the lighting device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
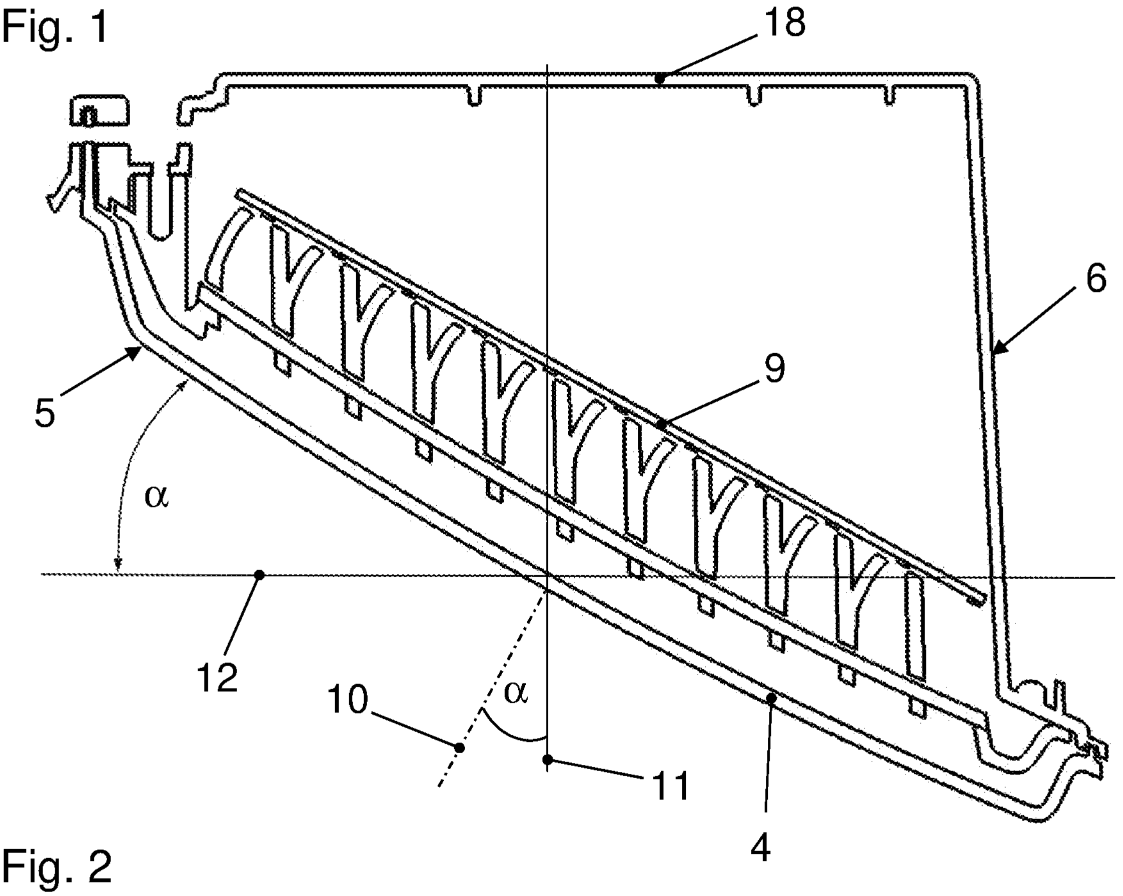
FIG. 1 is a cut through a lighting device according to the invention.

The embodiments of a lighting device according to the invention shown in FIGS. 1 to 10 comprise a plurality of light sources 1, which are arranged in line by line and column by column fashion in a two-dimensional array (see, for example, FIG. 1 to FIG. 4 and FIG. 8). The embodiments further comprise an optical disc 2 and extensive boundary elements 3, which extend between the light sources 1 and the optical disc 2. The embodiments further comprise an exit face 4, which is, for example, part of a transparent lens 5, which terminates a housing 6 comprised by the lighting device.

Figure 5:
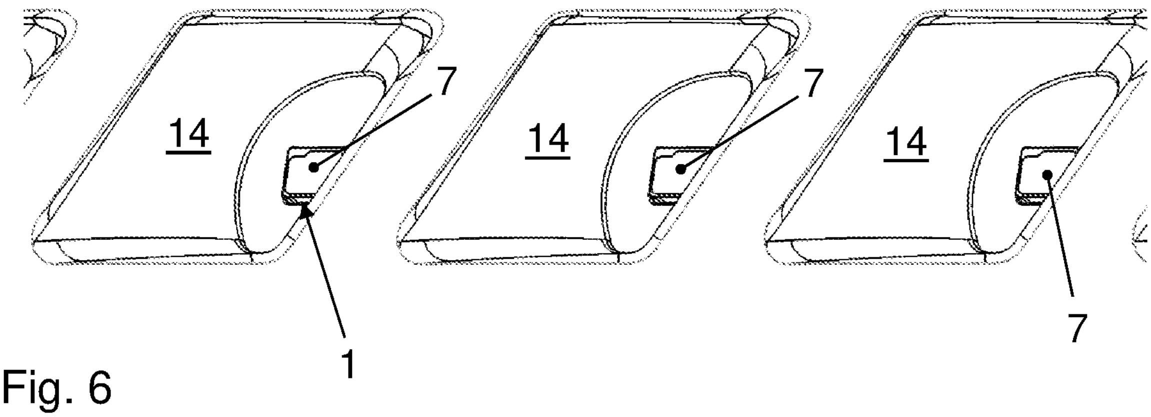
FIG. 5 is a front view into individual segments of a lighting device according to the invention.
Figure 6:
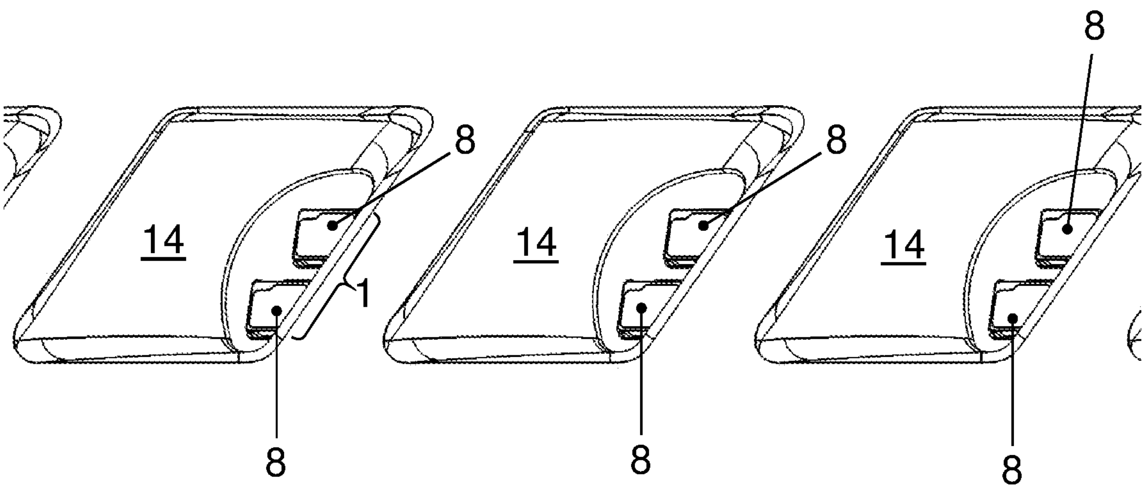
FIG. 6 is a front view into individual segments of a lighting device according to the invention.
Figure 7:
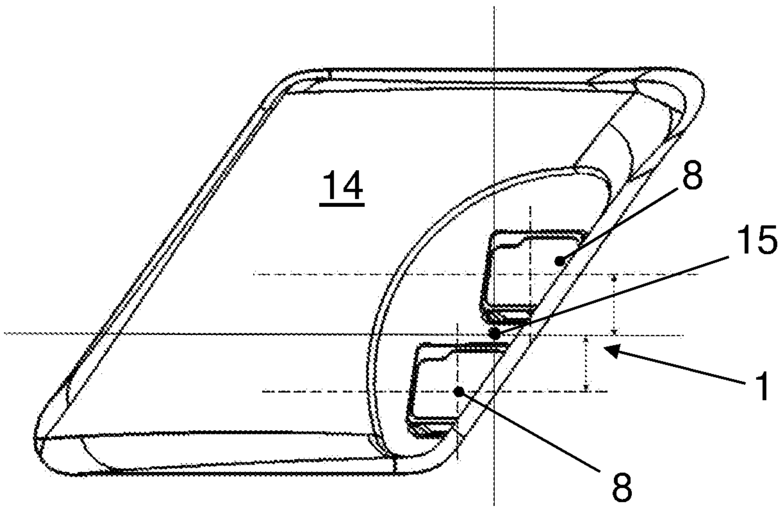
FIG. 7 is a detail of FIG. 6.
Figure 8:
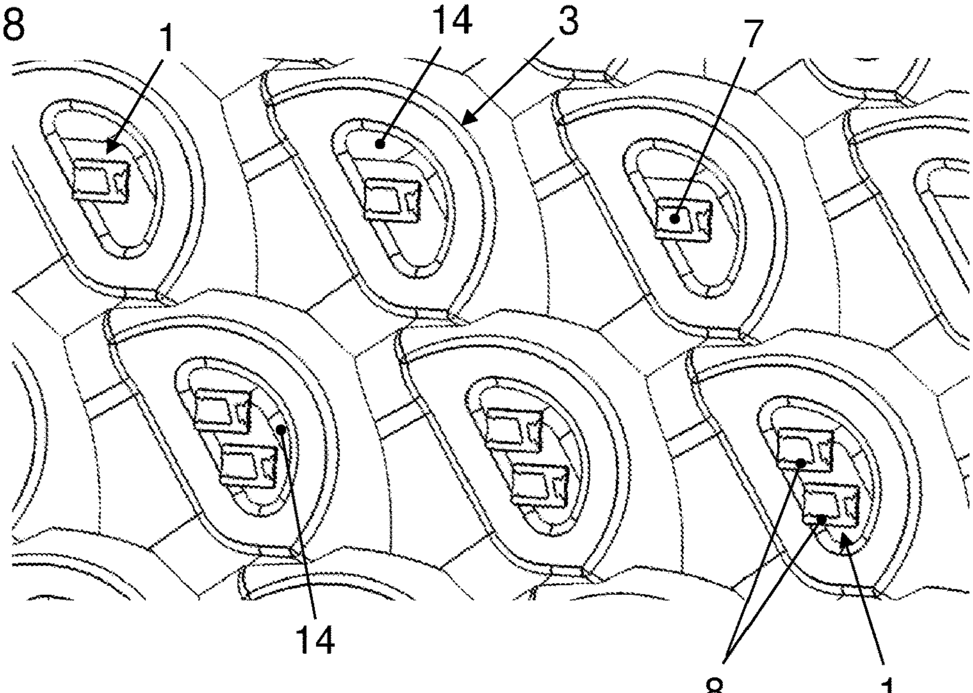
FIG. 8 is a rear view of individual segments of a lighting device according to the invention.
Figure 9:
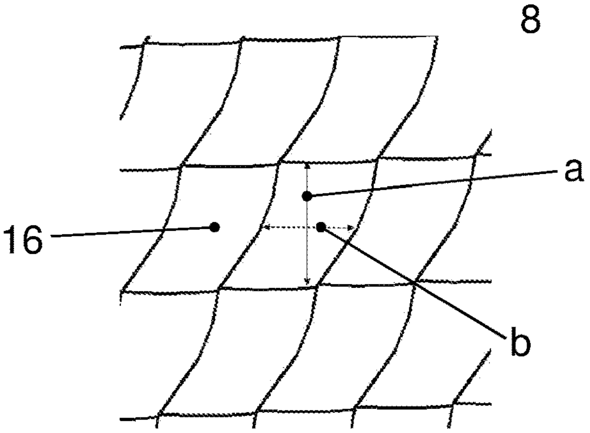
FIG. 9 is a detail of an optical disc of a lighting device according to the invention.

The light sources 1 may comprise at least one light-emitting diode 7, in particular an RGB light-emitting diode or two light-emitting diodes 8 of different colors (see, for example, FIGS. 5 to 7). A two-tone variant, for example with the signal colors red and yellow, offers the possibility of realizing all three main signal functions taillight, brake light and direction indicator of a rear light with different light signatures and animations in the entire pixel function region. Here, for example, a red and a yellow light-emitting diode or RGB light-emitting diodes can be used, which are formed as multichip LED or dual chip LED with a red and a yellow chip.

Each of the light sources 1, in particular each of the light-emitting diodes 7, 8 of the light sources 1 is individually controllable. In this way, different colors can be selected as desired for each segment or pixel of the exit face, wherein in particular an adapted individual design and positioning of a light function within the matrix formed by the segments is made possible.

Figure 2:
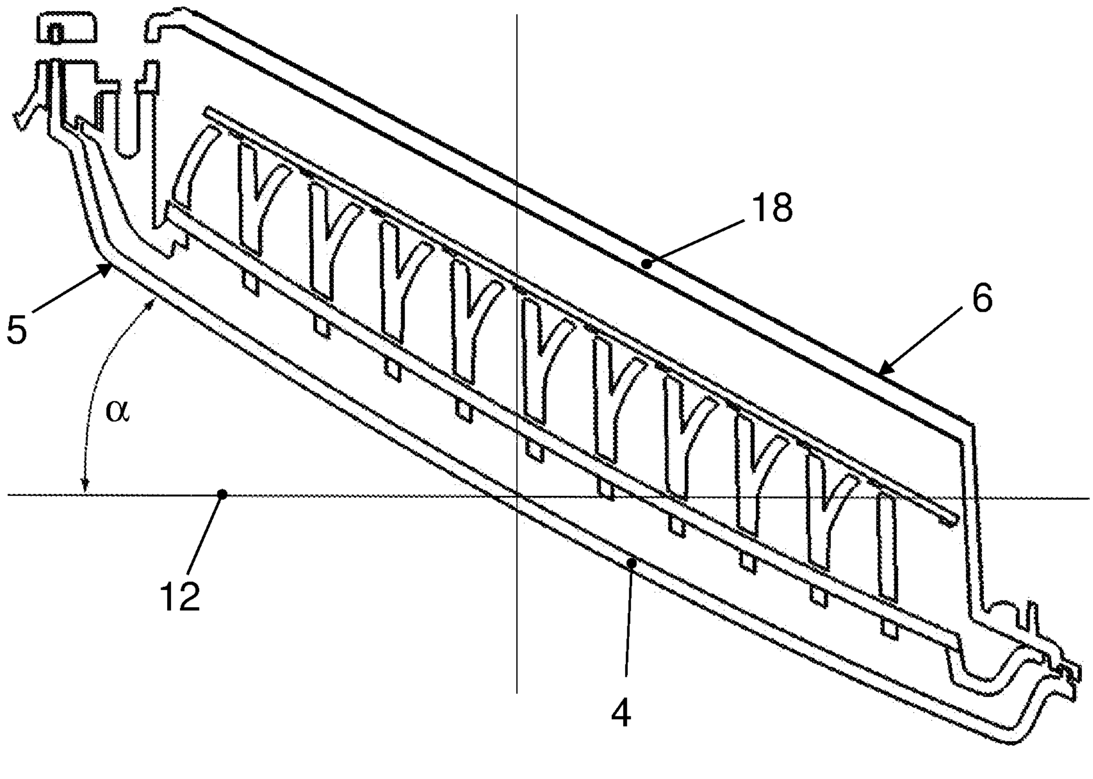
FIG. 2 is a cut through a second embodiment of a lighting device according to the invention.

The light-emitting diodes 7, 8 of all light sources 1 are preferably mounted on a common circuit board 9. The optical disc 2 and the exit face 4 are each arranged parallel to the printed circuit board 9, wherein the optical disc 2 is separated from both the printed circuit board 9 and the exit face 4. FIG. 1 shows an embodiment in which a large box-shaped housing 6 is provided. FIG. 2 shows an embodiment in which the housing back 18 is also aligned parallel to the printed circuit board 9 and to the exit face 4, so that a very extensive lighting device results.

The lighting device is installed in a vehicle in such a way that the normal 10 on the exit face 4 forms an angle $\alpha$ with the longitudinal direction 11 of the vehicle, which is greater than 25°, preferably greater than 30°. Accordingly, the exit face 4 with the vehicle transverse direction 12 forms the same angle $\alpha$ (see FIG. 1 and FIG. 2).

The extensive boundary elements 3 extend between the light sources 1 and the optical disc 2 in such a way that each of the extensive boundary elements are arranged in a grid-like manner. In each case, at least one boundary element 3 is arranged between two neighboring light sources 1 in the array or between the light 10 emanating from neighboring light sources 1 (see, for example, FIG. 3, FIG. 4 and FIG. 8).

The boundary elements 3 each have a reflector 14, wherein each of the light sources 1 is assigned to one of the reflectors 14. The reflectors 14 can each be designed as a parabolic reflector or free-form reflector. The reflectors 14 are shaped and aligned in such a way that the horizontal and, if necessary, also a vertical inclination of the printed circuit board 9 to the vehicle transverse direction 12 is compensated and that the light 13 reflected by the reflectors 14 runs largely parallel to the longitudinal direction of the vehicle after reflection (see FIG. 4). For example, when using the lighting device as a rear light, the light 13 emanates from the reflectors 14 against the direction of travel to the rear.

As a result, the reflectors 14 are arranged in such a way that the light 13 emanating from the light sources 1 is reflected in a direction that forms the angle $\alpha$ with the normal 10 on the exit face 4. As a result, even with greater sweep angles and more strongly curved contour outlines of the lighting device, the light 13 of the individual light sources 1 can be appropriately deflected.

When using two light-emitting diodes 8 per light source 1, it is advantageous to position both light-emitting diodes 8 close to each other or on top of each other in the respective segment (see FIG. 7). The reflector 14 designed as a parabolic reflector or free-form reflector is then focused on a focal point 15, which is arranged in the middle between the two light-emitting diodes 8 positioned close together (see FIG. 7). Due to the low focal length of the reflector 14, the light-emitting diodes 8 positioned close to it already result in a scattering of light 13, which can be further supported by a structure or optics or white version of the reflector 14, which ensures homogeneous illumination of the optical disc 2 or the segment of the optical disc 2 assigned to the light source 1. Thus, a high-quality, uniform illumination can be realized. Due to a low defocusing of the two light-emitting diodes 8 relative to the reflector 14, no major further error or scattering is introduced into the system.

Furthermore, it is provided that the light-emitting diode 7 or the multiple light-emitting diodes 8 are each positioned close to the vehicle's inner boundary of the segment (see FIG. 5 to FIG. 7). As a result, with a given horizontal rotation of the system, a surface of the reflector 14 can occupy the maximum region in a segment to compensate for the horizontal angle of rotation for the correct deflection and alignment of the light 13 and thus provide a high degree of efficiency. The efficiency is further optimized, because with this arrangement of at least one light-emitting diode 7, 8, its light 13 emanates both directly forward in the direction of the optical disc 2 and on the reflective surface of the reflector 14 for effective deflection, so that the light 13 of the light-emitting diodes 7, 8 is optimally utilized (see FIG. 4). The reflective surface of the reflector 14 is effectively illuminated, because the at least one light-emitting diode 7, 8 is already more oriented to the reflective surface of the reflector 14 by the horizontal rotation of the printed circuit board 9 and the light-emitting diodes 7, 8 arranged on it than forward to the optical disc 2.

Figure 3:
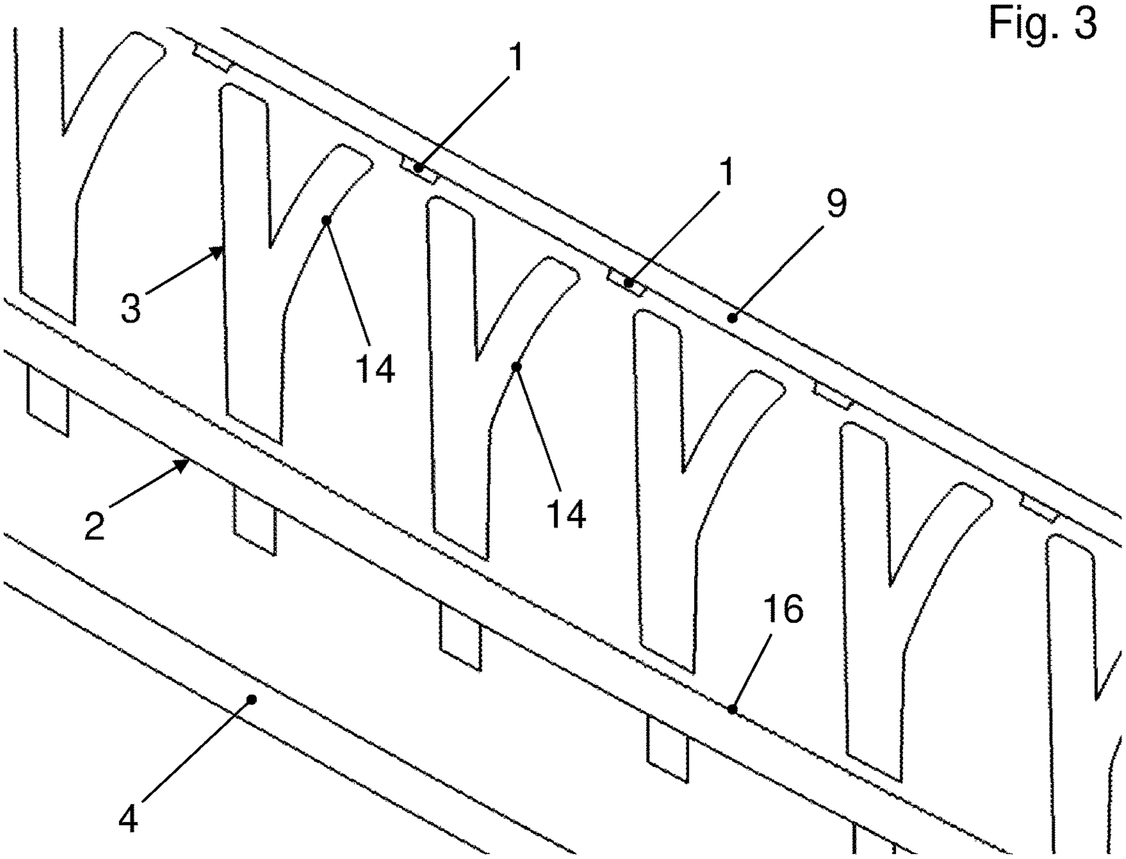
FIG. 3 is a detail of FIG. 2.
Figure 4:
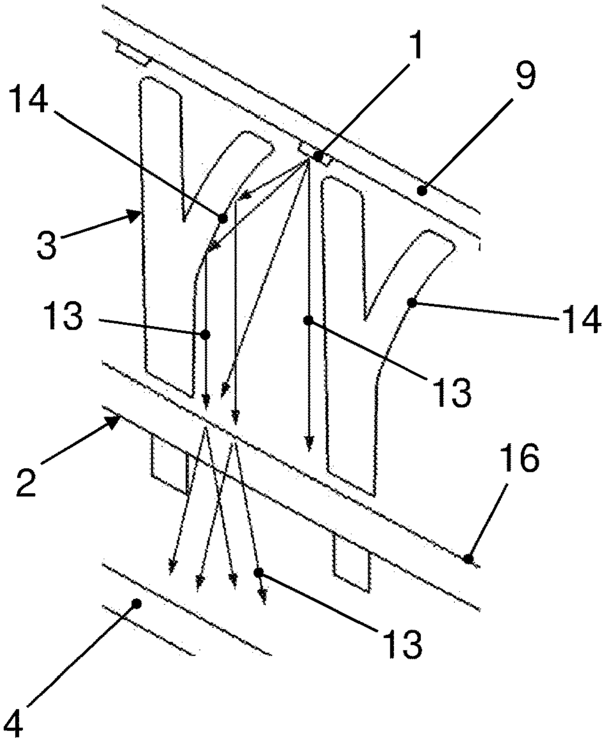
FIG. 4 is a detail of FIG. 3 with an exemplary course of some light rays.

The optical disc 2, through which the light 13 passes, is provided with a scattering optics 16 (see, for example, FIG. 3 and FIG. 4). The scattering optics 16 can be a conventional pillow optics, whose dimensions a, b (see FIG. 9) should be smaller than 1 mm, ideally about 0.5 mm or even smaller, to generate a uniform illumination of the exit face. For a special adjustment, such as in an extremely obliquely arranged system, the pillow optics can also be designed on (not pictured) prism surfaces.

Alternatively, diffractive optics, in particular diffractive holographic diffuser optics, can be used with optical structures in the single-digit micrometer range or higher nanometer range, which can no longer be dissolved by a viewer and are perceived as a diffuse scattering surface.

Figure 10:
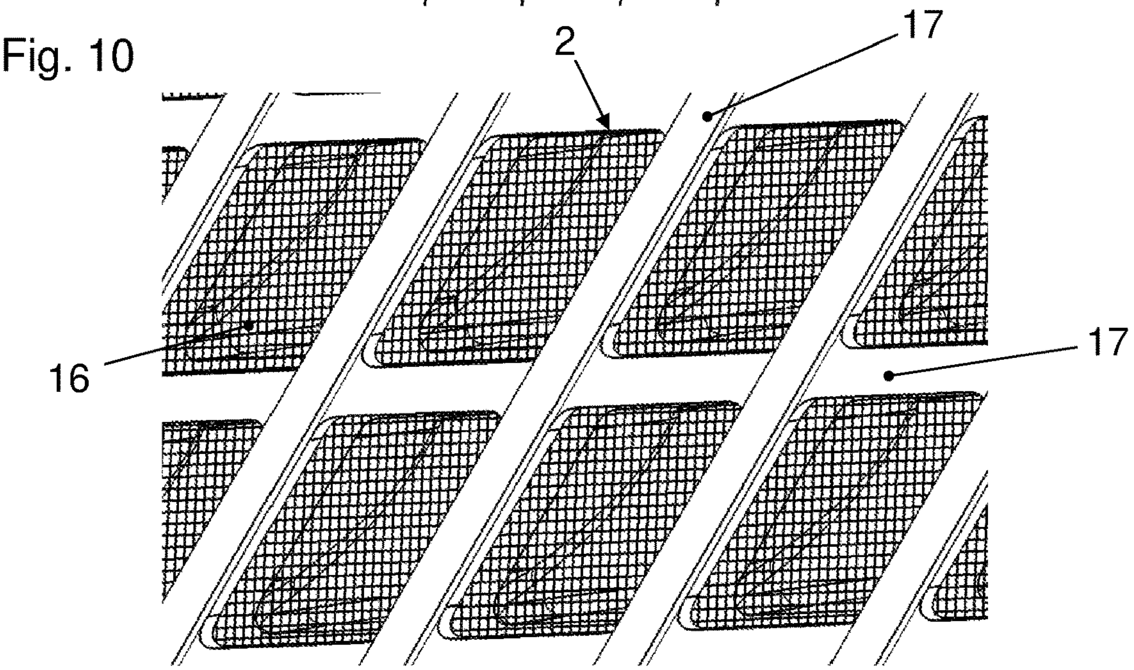
FIG. 10 is a detail of an optical disc of a lighting device according to the invention.

In the embodiment shown in FIG. 10, a grid 17 is provided, which is arranged on the side of the optical disc 2 facing away from the light sources 1. For example, grid 17, which is designed as an aperture grid or design grid, can more clearly highlight the separation of the optical disc 2 into segments. In this way, a design element can also be provided, which can serve, for example, with different coloring for design variants of the lighting device.

The grid 17 may be designed as a plastic injection part, such as a black component, gray component or colored component or it may subsequently be mirror-coated or painted. Alternatively, a formation of the grid 17 as an extensive component is possible, for example as a metallic grid element, which can also be attached directly to the optical disc 2 during injection molding as an insert in the injection mold. As a further alternative, it is also conceivable to simply print the black or colored grid 17 on the optical disc 2, for example in screen printing or pad printing. This is particularly suitable for extensive optical discs 2.

Figure 11:
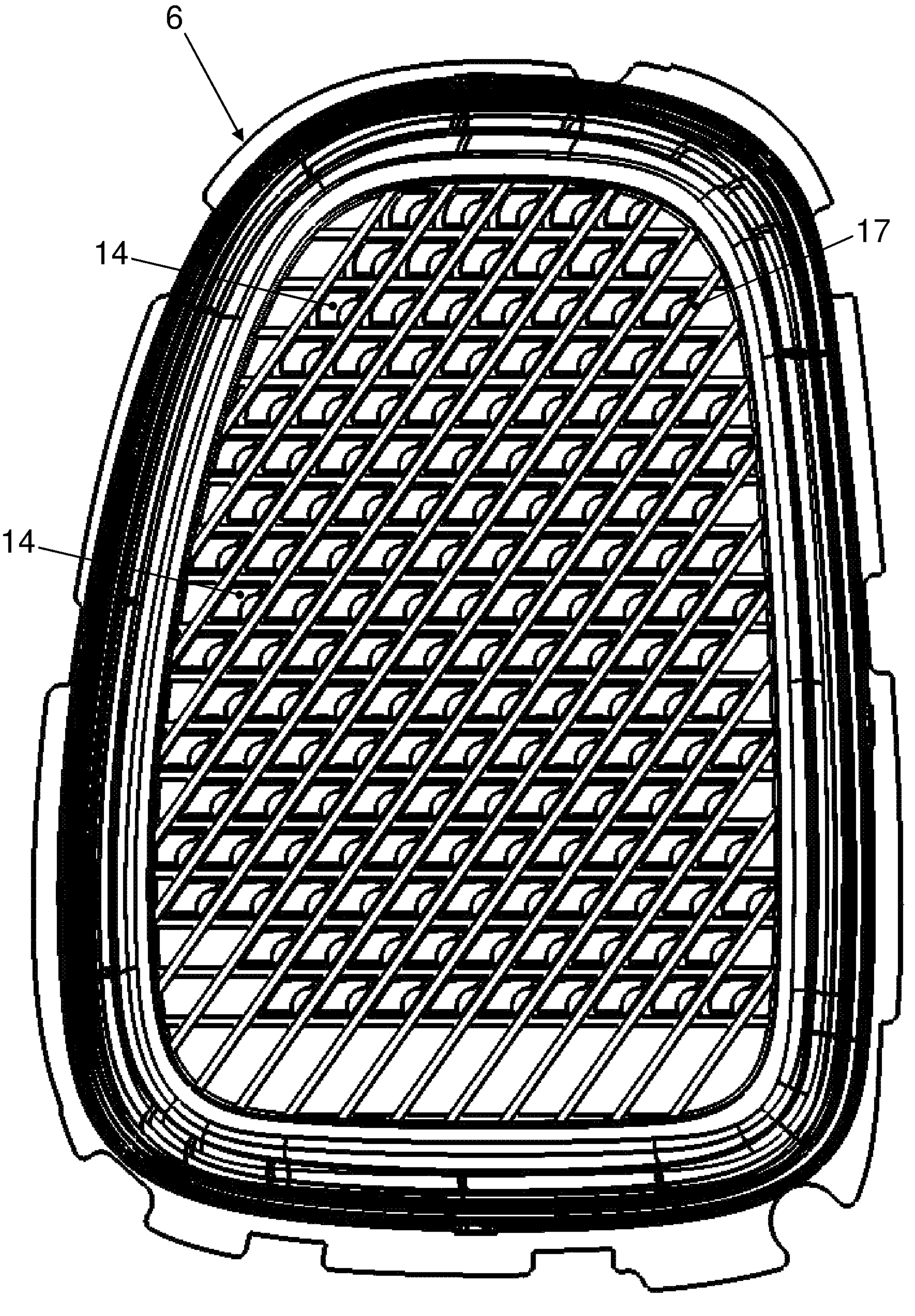
FIG. 11 is a front view of a lighting device according to the invention.
Figure 12:
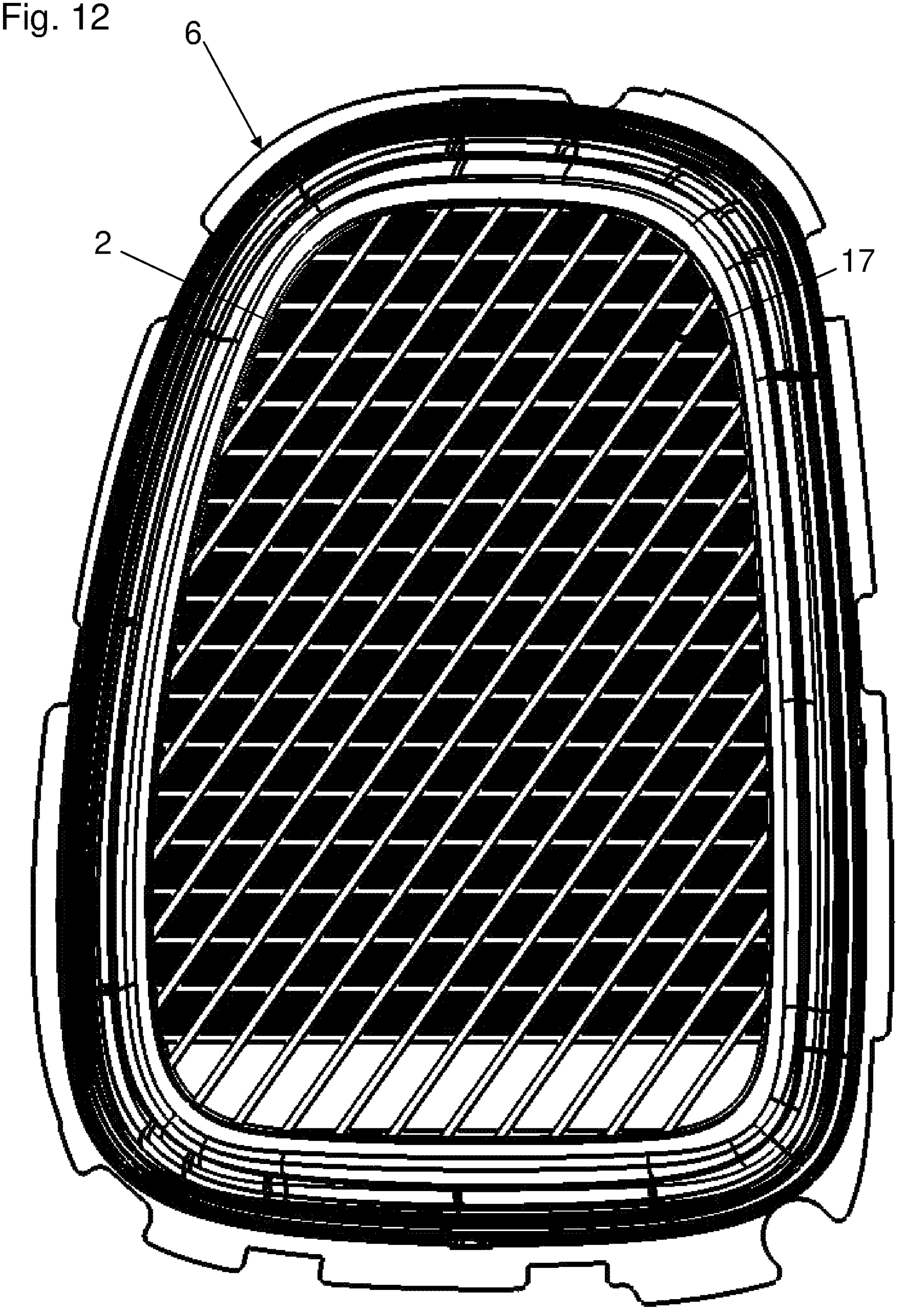
FIG. 12 is a front view of a lighting device according to the invention.

FIG. 11 shows an embodiment of the lighting device without optical disc 2, which is an alternative with a sufficient scattering by the reflector 14 to eliminate the optical disc 2 as a component. FIG. 12 shows an embodiment of the lighting device with optical disc 2. In this embodiment, the reflectors 14 and the light sources 1 are not visible when looking through the exit face 4.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A lighting device for a vehicle, the lighting device comprising:

at least two light sources that are arranged in an array and are operatable independently of each other, the at least two light sources emitting light during operation and being provided inside of a housing;

an exit face through which the light emanating from the at least two light sources passes, the exit face being a transparent lens that covers an opening of the housing; and at least two extensive boundary elements, which extend at least in part in a region between the at least two light sources and the exit face and separate the light emanating from each of the at least two light sources, wherein at least some or all of the at least two extensive boundary elements have a reflector, the reflectors each being associated with a respective one of the at least two light sources to at least partly reflect the light emanating from the respective one of the at least two light sources in the direction of the exit face, and wherein the light emanating from the light sources exits to an exterior of the housing of the lighting device via the exit face after the light has been at least partly reflected by the reflectors, and wherein a linear portion of each of the at least two extensive boundary elements extend parallel to each other, and wherein the linear portion of each of the at least two extensive boundary elements extend in a longitudinal direction of the vehicle.

2. The lighting device according to claim 1, wherein the reflectors are arranged such that the light emanating from the at least two light sources is reflected in a direction which forms an angle greater than 0° with the normal on the exit face.

3. The lighting device according to claim 1, wherein a direction in which the light emitted by the at least two light sources is reflected, in the state of the lighting device installed in the vehicle, is substantially parallel to the direction of travel or to the longitudinal direction of the vehicle.

4. The lighting device according to claim 1, wherein each of the at least two light sources is assigned to a respective one of the reflectors.

5. The lighting device according to claim 1, wherein at least some of the reflectors are designed as parabolic reflectors or free-form reflectors.

6. The lighting device according to claim 1, wherein at least some of the at least two light sources comprise at least one light-emitting diode that is an RGB light-emitting diode or a two-color light-emitting diode or two light-emitting diodes of different colors.

7. The lighting device according to claim 6, wherein each of the at least two light sources is individually controllable, or wherein each of the two light-emitting diodes of a single light source is individually controllable.

8. The lighting device according to claim 6, wherein the lighting device comprises at least one printed circuit board on which the light-emitting diodes are arranged, or wherein all of the light-emitting diodes are arranged on a maximum of three printed circuit boards or on only one printed circuit board.

9. The lighting device according to claim 8, wherein the at least one printed circuit board is arranged substantially parallel to the exit face.

10. The lighting device according to claim 1, wherein the at least two extensive boundary elements are arranged in a grid-like manner, wherein between every two of the at least two light sources adjoining in the array and/or between the light emanating from neighboring light sources, at least one of the at least two extensive boundary elements is arranged.

11. The lighting device according to claim 1, wherein a plurality of the at least two extensive boundary elements forms a single-piece component or all of the at least two extensive boundary elements form a single-piece component.

12. The lighting device according to claim 1, wherein the lighting device comprises an optical disc which is arranged between the at least two light sources and the exit face or between the reflectors and the exit face, and wherein the light emanating from the at least two light sources passes through the optical disc.

13. The lighting device according to claim 12, wherein the optical disc is structured with a scattering optics, pillow optics or diffractive optics.

14. The lighting device according to claim 12, wherein the optical disc is formed and/or arranged such that the at least two light sources and/or the reflectors are not directly visible when looking through the exit face into the lighting device.

15. The lighting device according to claim 12, wherein the lighting device comprises a grid which is arranged on a side of the optical disc facing away from the at least two light sources, wherein the grid extends around the reflectors.

16. The lighting device according to claim 1, wherein the reflectors are arranged such that the light emanating from the at least two light sources is reflected in a direction which forms an angle greater than 30° with the normal on the exit face.

17. The lighting device according to claim 1, wherein the at least two light sources are mounted directly on a first surface of a printed circuit board, and wherein, with respect to a direction of the light emanating from the at least two light sources, an entirety of the at least two extensive boundary elements and reflectors are spaced apart from both the first surface of the printed circuit board and the at least two light sources mounted directly thereon.

* * * * *